May 9, 1967 A. REGNIER ETAL 3,319,009

PATH SELECTOR

Filed Nov. 20, 1963 6 Sheets-Sheet 1

Inventors:
A. REGNIER
J. J. R. P. DE BUCK
By [signature]
Attorney

PATH SELECTOR

Filed Nov. 20, 1963

*Inventors:*
A. REGNIER
J. J. R. P. DeBuck
By Philip A. Weiss
*Attorney*

May 9, 1967 A. REGNIER ET AL 3,319,009

PATH SELECTOR

Filed Nov. 20, 1963 6 Sheets-Sheet 3

Inventors:
A. REGNIER
J. J. R. P. DeBUCK
By Phillip A. Weiss
Attorney

PATH SELECTOR

Filed Nov. 20, 1963

Inventors:
A. REGNIER
J. J.R.P. DEBUCK
By [signature]
Attorney

Inventors:
A. REGNIER
J. J. R. P. DE BUCK
By Philip A. Weiss
Attorney

Inventors:
A. REGNIER
J. J. R. P. DE BOCK
By Phillip A. Weiss
Attorney 3,319,009
PATH SELECTOR Albert Regnier, Issy-les-Moulineaux, and Jean Jacques René Paul De Buck, Paris, France, assignors to International Standard Electric Corporation, New York, N.Y., a corporation of Delaware Filed Nov. 20, 1963, Ser. No. 324,947
Claims priority, application France, Nov. 28, 1962, 916,895, Patent 1,382,913
9 Claims. (Cl. 179—18)

The present invention relates to path selectors for telephone switching systems and more particularly to such selectors a plurality of crosspoint for use in crosspoint telephone switching network arranged in a plurality of stages.

It is well known by those skilled in the art to utilize a display network of the crosspoint switching network arranged in a plurality of stages for selecting a transmission path between two marked terminals of such a network. The portions of the switching network which are necessary and sufficient to identify a path, are represented in the display network.

One object of the invention is to provide methods for selecting a connection path by utilizing a display network, which will be faster and less costly than the methods already known, and which moreover will allow the selection of paths comprising overflow channels and the selection of the shortest path amongst the various possible free paths. Furthermore, the selection, according to the invention may be used with telephone switching systems comprising various types of crosspoint matrices.

Two types of systems utilizing display networks are already know. According to the first type, different intermediate links or connections between matrices of different stages have corresponding time shifted pulses generated by a distributor. Different links in series that constitute a plurality of available paths through the network have a corresponding plurality of coincidences between pulses. A free path is identified according to the time position of such a coincidence. This system has the drawback of requiring a distributor having a large number of separate outlets, which is relatively expensive. Also this system requires fixed upper frequency limit in the information lines in order to enable the information lines to transmit the different pulses with the required timing sequence.

In the second type of system, a voltage difference is obtained between the two marked terminals of the display network, making a current flow through all the free paths, unless only one free path can hold, as in certain very simple networks. The identification of one free path amongst a plurality thereof, then requires successive scanning of the matrix stages, each section of a free path being successively selected. A single distributor or scanner operating in succession is sufficient, and the operation time of the display network is reduced; but it is necessary to switch over a gate per stage level towards the scanner. Another drawback is that matrices multipled in part cannot be utilized, unless a number of diodes, for instance, be provided for each crosspoint, which would be prohibitive.

The system according to the invention avoids the drawbacks of the two above-mentioned systems. To this end, according to the present invention, there is effected a selection of free connecting paths in a switching network comprising any number of stages or crosspoint matrices. The display network represents the matrices by nodes, and is utilized for selecting a free path corresponding to the searched connection path between two marked points. This system being characterized in this that it comprises first the marking of the nodes located on idle paths between the two said points, then the selection and the identification of one of the inlets of the last node that give access to the lower point, and the engagement of the other node linked to said inlet which is taken as a new lower point.

According to the system, the marking of the nodes which are located in free or idle paths is characterized in this that the propagation of the marking of the upper marked point towards the lower point undergoes a definite delay when crossing each node.

The system stated above is also characterized in this that the lower marked node receives the marking transmitted from the upper point in the form of a pulse train, each pulse having a time position corresponding to the space position of an inlet of said lower node.

An advantage of the invention now appears more clearly. As only a single node is considered at a time, the electronic pulse distributor which transmits pulses towards the lower node for selecting a free inlet is common to all the nodes of the network and has a number of outlets equal to the number of inlets of the node which has the largest number thereof.

According to another feature, a node in the display network of the invention is provided with a memory function and is constituted by a bistable circuit which swings from the "off condition" to the "on condition" when a pulse is received at its inlet. The outlet of the bistable circuit in the "on condition" transmits a steady marking signal towards the nodes to which said node has access. The inlet of the bistable circuit is connected to AND gates corresponding to every intermediate link having access to said node. The AND gates have three inlets, the first receives the availability signal of the intermediate link, the second receives the marking signal from the corresponding upper node, and the third to receive a pulse at each cycle of the distributor.

The system according to the invention can also be applied to switching networks comprising overflow paths. For this purpose, there is provided that the marking propagation is submitted to a definite delay at the crossing of each intermediate node. The delay is constant and at least equal to the period of a cycle of the distributor. The passage of the marking through the last node that gives access to the lower marked point is effected as stated above and moreover causes the distributor to stop at the end of the considered cycle. According to another feature of the invention, the periods of the cycle of the distributor are shortened, all the inlets of the first nodes for instance, being scanned simultaneously up to the cycle corresponding to the passage of the marking through the last node that gives access to the lower point, which cycle is expanded, each inlet being separately scanned.

According to another feature of the invention, the passage of the marking through the last node that gives access to the lower point causes the already marked nodes to be locked and prevents a new marking of nodes, for instance in longer tracks.

According to another feature of the present invention, the passage of the marking through the last node that gives access to the lower point enables the selection of an inlet and therefore the selection of a preceding upper node. Said selection leading to suppress the marking of all the other nodes, whereafter the extension of the free path is searched for upon a new propagation of a marking signal between the upper point and the said selected node taken as a new lower point, and so forth till the last track section has been selected and identified.

According to another feature of the present invention, a node in the display network of a switching network in which overflow facilities are provided, is provided with the memory function and comprises an arrangement of AND gates having three inlets. The first inlet receives the availability signal of the link, the second receives the marking signal from the corresponding upper node, and the third receives one pulse at each cycle of the distributor. A first bistable circuit having the inlet connected to said AND gate arrangement, and the outlet connected to a second bistable circuit through a second AND gate having two inlets. The second inlet of the second AND gate is controlled at the end of each cycle of the distributor. The outlet of the second bistable circuit is multiplied to the next nodes.

Furthermore, in order to select a node and according to the invention, an inlet to this node on a free path, and whatever may be the structure of the nodes in the display network according to the invention, there is provided a selection AND gate per node. The select AND gates have two inlets. One inlet is connected to the outlet wire of the inlet multiple of the node, and the other inlet is connected to a device allowing to mark said gate, i.e. to select said node as a lower point.

The objects and features of the present invention will become more apparent from the following description of embodiments, and with reference to the accompanying drawings, in which:

FIGURE 1*a* represents a relatively simple telephone switching network;

FIGURE 1*b* represents linearly, and schematically, the corresponding display network;

Figure 4:
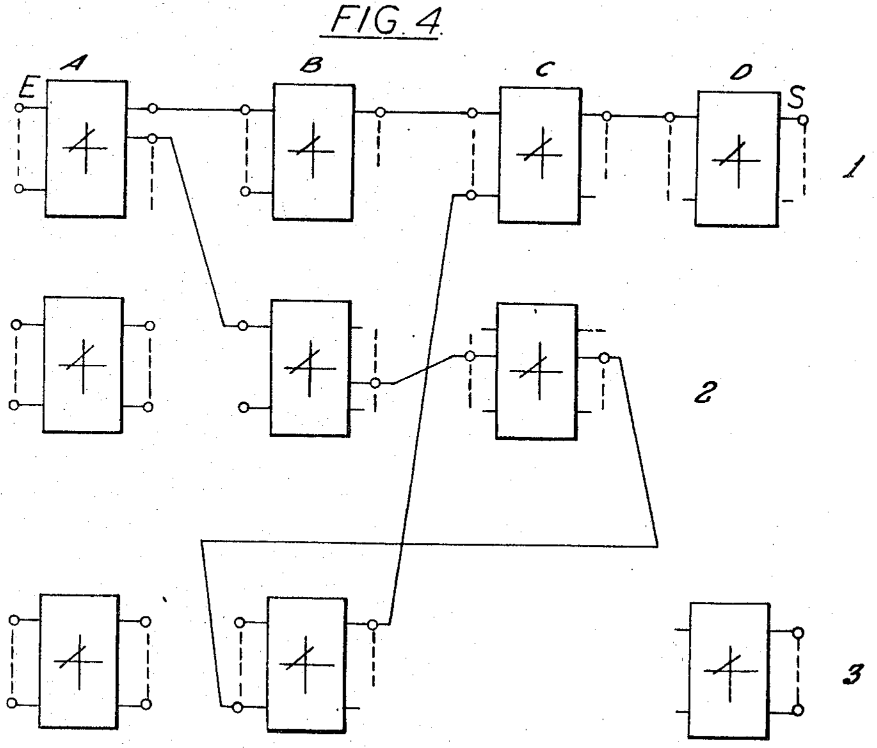
Figure 5:
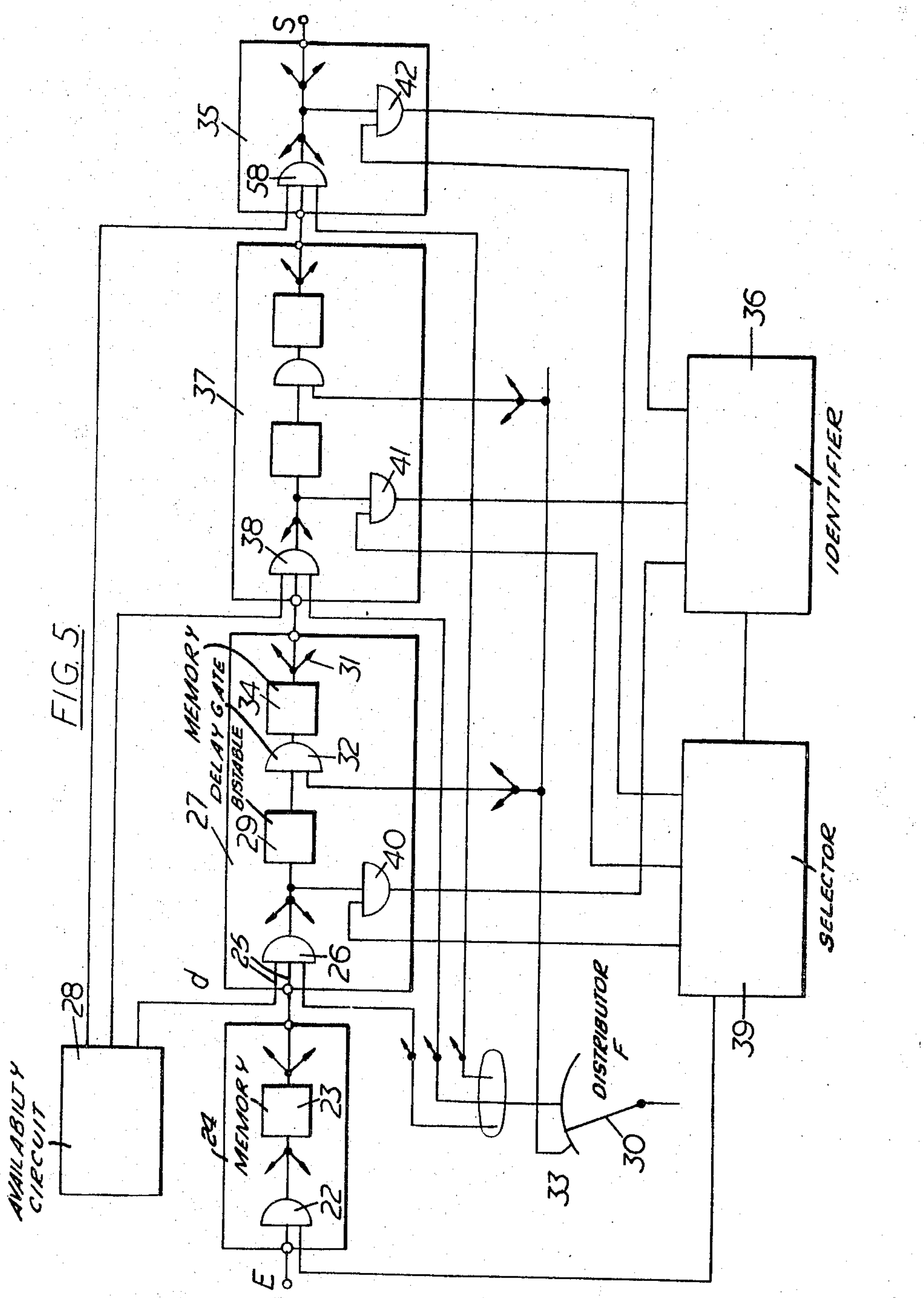
Figure 6:
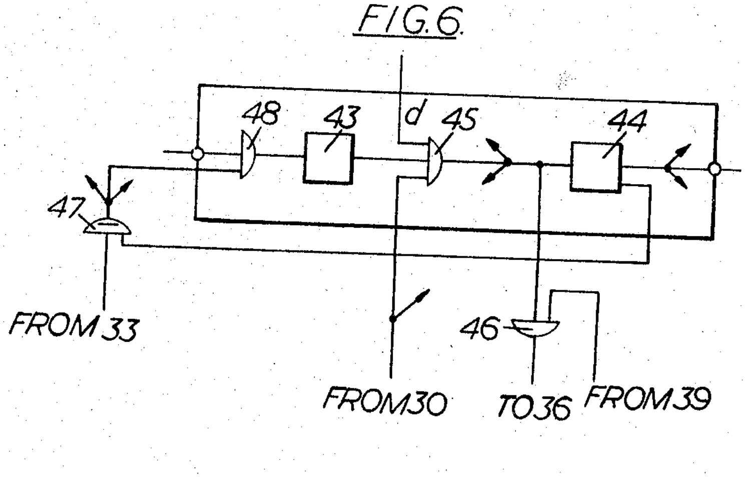
Figure 7:
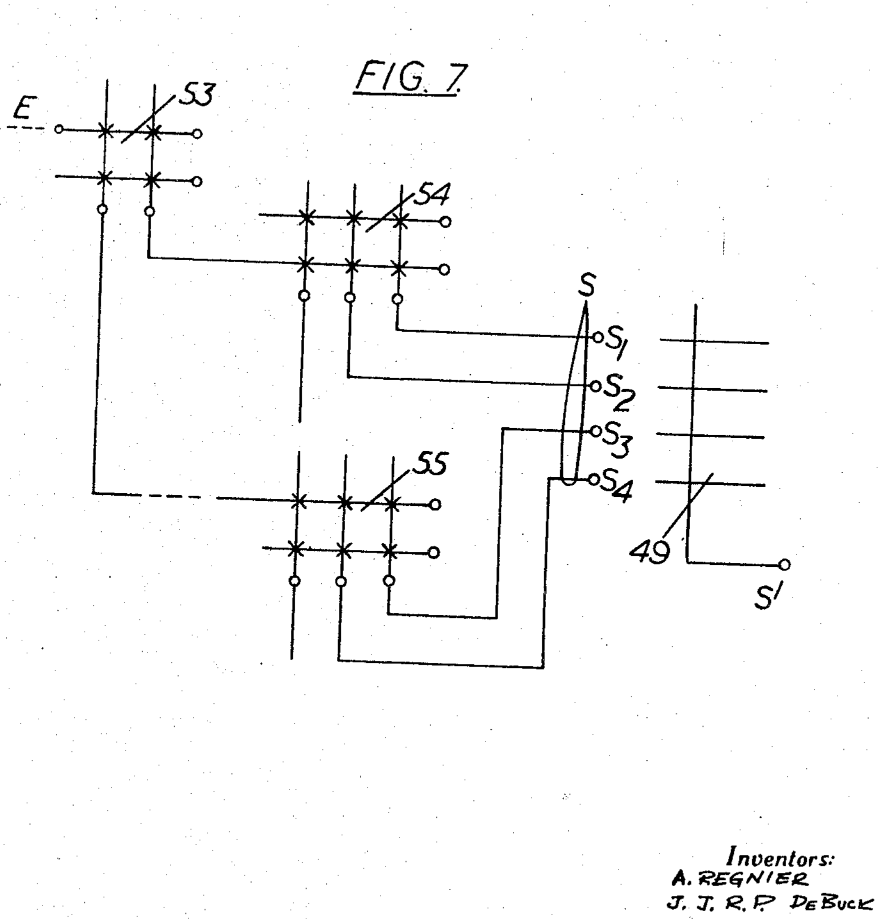
Figure 8:
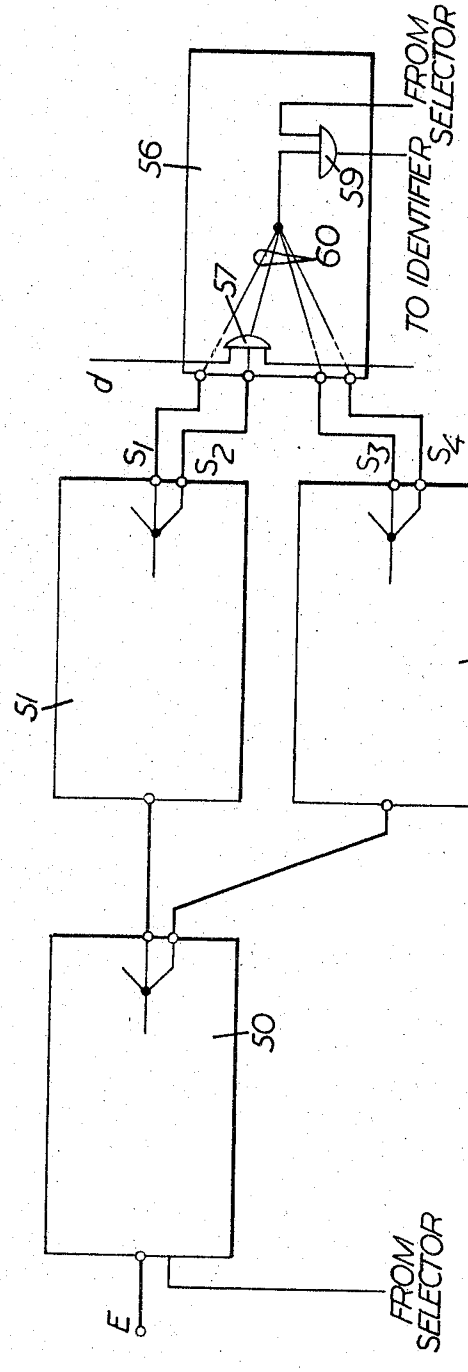

FIGURE 4 schematically represents the switching network enabling overflows;

FIGURE 5 represents linearly another embodiment of the display network according to the invention, utilized with a network of the type shown in FIGURE 4;

FIGURE 6 represents another embodiment of the node utilized in a display network of FIGURE 5;

FIGURE 7 schematically represents an embodiment of switching network allowing free searches; and FIGURE 8 represents a display network corresponding to the embodiment of FIGURE 7.

Figure 1A:
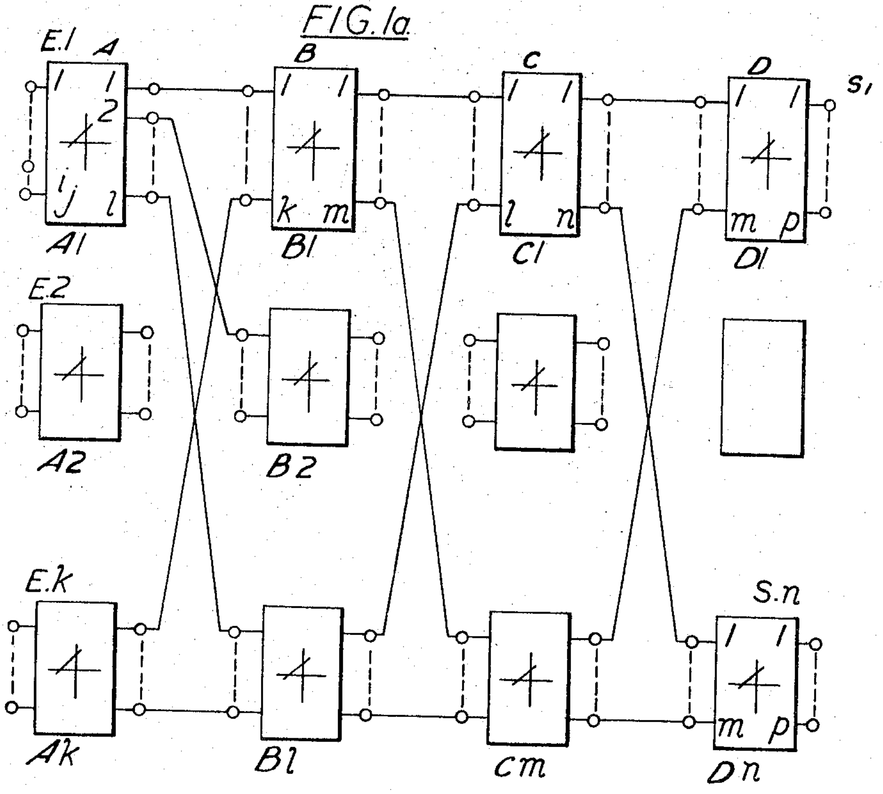

FIGURE 1*a* represents a telephone switching network comprising the switching stages A to D. Each stage comprises a plurality of switching matrices, for instance stage A comprises matrices $A_1$—$A_k$, stage B matrices $B_1$—$B_l$, etc.

In said embodiment, the matrices like that represented in detail as $A_1$ are complete matrices, i.e. matrices wherein each intersection of coordinates comprises a crosspoint. From another point of view, matrix $A_1$ is also a simple matrix, as inlets of the matrix are arranged along one coordinate (vertical) whereas outlets are arranged along the other coordinate (horizontal). However, this does not constitute a limitation to the scope of the invention.

In the following description, what is called "crosspoint" encompasses such things as sealed contact magnetic devices (reed-relay type), cold cathode tubes, or transistors, etc. Cross coil or cross-bar selectors may also be used as matrices. In any way, the nature of the crosspoint is independent of the object of the invention.

Reverting to FIGURE 1*a*, inlets E of the network are substantially the inlets of stage A matrices and are marked by the rank of the matrix in the stage and by the inlet level in the matrix; for instance, $E_{11}$ corresponds to an inlet of the first matrix at level *i*. Outlets S are also marked by the rank of the matrix in stage D and by the outlet level in the matrix. Each matrix of a stage is linked to matrices of the preceding or the following stage by circuits called links. One matrix of a stage can be linked to one matrix of a preceding or a following stage by one or a plurality of links. Obtaining the identity of all links connecting the linked matrices are used to identify the crosspoint linking them.

It is known to utilize a common control device, generally called marker, for establishing the communication paths according to the "one at a time" principle.

Figure 1B:
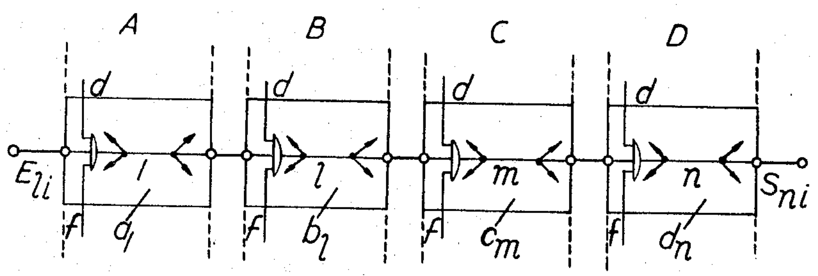

FIGURE 1*b* represents a linear partial view of a display network of the network shown in FIGURE 1*a*. Each stage is again designed as A, B, C or D, and each matrix is represented by a section of line referenced by a number. In the following description, the matrix including the input and output multiplings corresponding to inputs and outputs of the matrix will be represented by circuitry called a "node."

As stated above, according to the invention, knowing the operated or switched through condition of a matrix or a lower point is necessary to select the next upper matrix. Therefore, each input wire to the node is coupled to the input of an AND gate. The selection of this gate is sufficient to identify the next upper matrix when the lower matrix is in its switched through condition. The three inlets of this AND gate are linked as follows: the first to an outlet of the preceding node, the second (*d*) to a link-availability circuit, and the third (*f*) to a device used for selecting the gate.

By way of example, in FIGURE 1*b*, the display of a possible path between inlet $E_{11}$ and outlet $S_{n1}$, has been shown, which path goes successively through matrices $A_1$, $B_1$, $C_m$ and $D_n$. In the display network, the path goes through the nodes $a_1$, $b_1$, $c_m$ and $d_n$. It will be understood that there are as many "nodes" as matrices per stage, and that the outlet multiple of each "node," give access to the inlet multiples of the following "nodes," those skilled in the art being able to wholly restore the display network, knowing the composition of a "node" and the gates placed in the inlet multiple.

Figure 2:
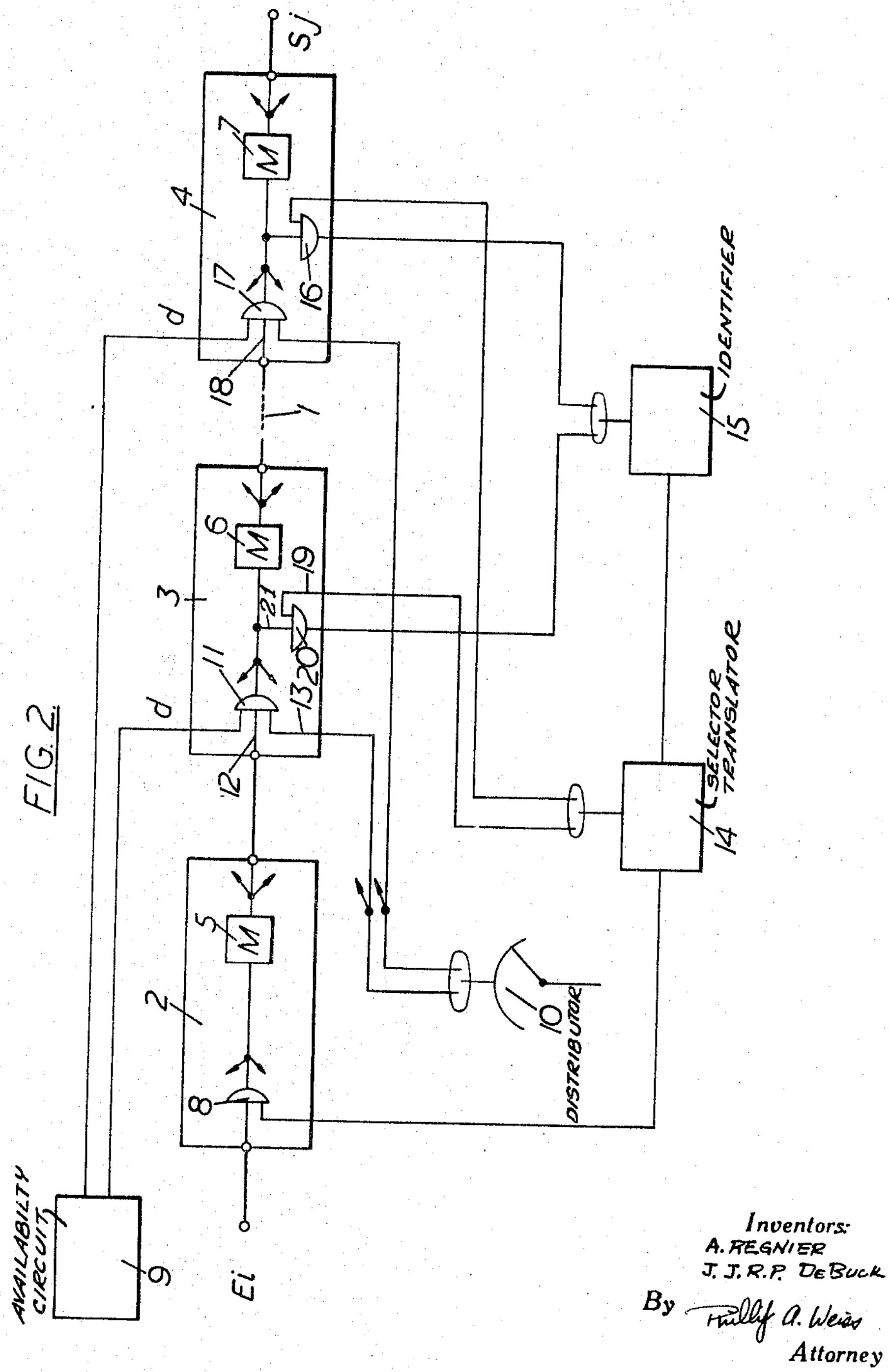
FIGURE 2 represents linearly an embodiment of the display network according to the invention.

FIGURE 2 represents a display network according to the invention. In this display network, only three stages have been represented through many more stages could be involved, as indicated by the dotted line 1. Each node 2, 3 or 4 comprises a store element or flip-flop 5, 6 or 7 respectively, which is normally in the "off condition" and which is switched "on" by a pulse from anyone of the AND gates of the inlet multiple. In the "on condition," each flip-flop or memory applies a lasting signal to all the wires of the node outlet multiple. The process of marking all the "nodes" met on free paths goes on in the network of FIGURE 2 as follows: Input $E_i$ and output $S_j$, for instance, are the point to be linked. A marking signal is applied to input $E_i$ of the network. As soon as AND gate 8 is open, the marking reaches memory 5 which transfers it to the AND gates in the inlet multiple of all the "nodes" of the second stage, to which the first "node" has access; "node" 3 is one of these "nodes." As previously stated, these AND gates have there inlets, one of which is linked to the memory of the preceding "node," while the second inlet is linked through a wire *d* to the availability circuit 9 and the third inlet is linked to distributor 10 the number of points of which is equal to the number of inlet levels per matrix. The availability circuit contains stored availability conditions of the links in the switching network. It delivers a lasting signal on wires *d*, when a link is free, and no signal when the link is busy.

Assuming that the link which connects "node" 2 to "node" 3 is free, an availability signal is applied to wire *d* of gate 11. It has already been stated above that the marking applied to inlet $E_i$ had been transferred up to the second inlet 12 of gate 11. When distributor 10 sends a pulse to the third inlet 13 of gate 11, a signal appears at the outlet of said gate which switches over memory 6 to the "on condition," thus causing the second inlets of the AND gates to be marked in the inlet multiples of the following stage, and so forth. It will then be understood that the marking thus proceeds step by step up to outlet $S_j$. The appearance of a lasting signal or a pulse at the oulet wire S ends the process of marking the free "nodes." It will be immediately noticed that memory 7 is not absolutely necessary for the last "node" 4. The latter may be directly under the control of the marker or, as shown, a selector-and-translator 14 and an identifier 15 through gate 16. In fact, this assumes that outlets S have only access to a single matrix. The marking process ends when a pulse is received in identifier 15.

Now it will be necessary to identify and select links forming a path amongst all those wherein "nodes" have been marked. This operation is effected by going back through the chain of matrices.

A train of pulses received in identifier 15 will enable the identifier to select one of the marked links, i.e., an AND gate, for instance gate 17 at the inlet of the last "node" 4.

Figure 3:
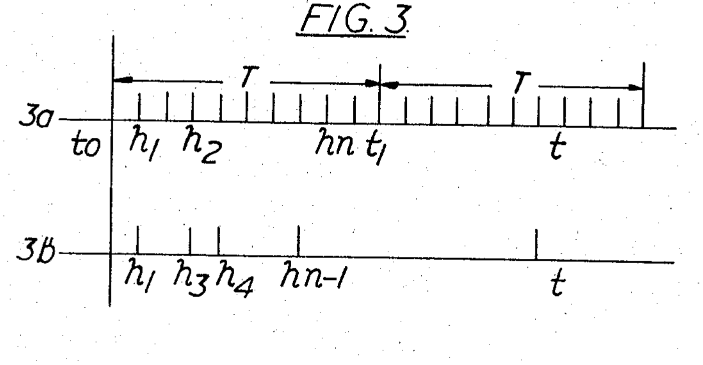
FIGURE 3 represents a diagram of the signals travelling through the display network of FIGURE 2.

There will be described in a more detailed form the last part of the marking process and the selection of a free link by means of the identifier 15 as soon as all the available "nodes" located at the same stage as 3 have been marked, assuming that this stage is the penultimate. Potentials exist on all wires 18 of gates 17. Distributor 10 then transmits successively a train of pulses, as indicated by diagram 3*a* of FIGURE 3, each pulse $h_1, h_2 \ldots h_n$ representing in a time position the spatial position of an inlet level of a "node" in the stage. Therefore, according to the availabilities of links, i.e. the presence of a potential or no potential on inlets *d* of gates 17, a train of pulses $h_1$, $h_3$, $h_4$ and $h_{n-1}$ represented in FIGURE 3*b*, will appear at the outlet of the inlet multiple, each pulse representing a free inlet link as a time position. This train of pulses is transmitted through AND gate 16 to identifier 15.

Identifier 15 comprises means which are able, according to the time position of a pulse in the train represented in FIGURE 3*b*, to select in the space one of the inlet gates 17, i.e., one of the "nodes" of the preceding stage. The seizing of the preceding "node" is effected by applying a lasting signal to the inlet 19 of an AND gate 20 corresponding to "node" 3.

At this time, distributor 10 is against started and, by the same process as previously, a train of pulses will be received at the second inlet 21 of gate 20, then in identifier 15 which performs a new selection as previously stated. Thus, step by step, through this process, a complete path between inlet $E_i$ and outlet $S_j$ is selected.

In a preferred modification of the invention, when a train of pulses shown in FIGURE 3*b* is received, identifier 15 selects among the inlet gates that correspond to the first pulse received.

Distributor 10, selector 14 and identifier 15 are three common circuits which are, for instance, part of the general common circuit called marker. Distributor 10 is constituted, for instance, as the scanner shown on page 59 of the "Revue Commutation et Electronique" No. 3, November 1962, and operates substantially in the same way when in connection with a clock. Identifier 15 is a time-to-space converter well-known to those skilled in the art. In fact, the identifier, knowing the time position of a pulse, translates it into a space position and transmits it to selector 14. The latter, knowing the lower "node" and the selected inlet level, deduces therefrom, if necessary by a translation made in a connection bank, the identity of the next "node" to be selected for linking it to identifier 15.

These three circuits (pushbutton, selector and identifier) are also utilized in the following embodiments: a network having paths of various length, and a network involving the free search of outgoing paths. Moreover, the rotation of priorities, which permits an even distribution of the traffic on all the links will be described.

The case of long-link networks concerns the overflow of the traffic. One of the characteristics of the process is precisely a great flexibility in this respect. Numerous types of overflows are possible, the normal paths being characterized by the fact that they are shorter than the overflow paths. The derived or overflow paths are relatively long and the priorities decrease from the shortest to the longest path. Therefore, the display network shown in FIGURE 2 has been modified by introducing a delay at each crossing of a "node" during the process of marking the "nodes." When calling T the delay introduced and taking into account that the inlet and outlet "nodes" will be forcibly marked and therefore will not introduce any delay, the first pulse of the train of pulses shown in FIGURE 3*b* will appear at the outlet with a delay comprised between $(m-2)T$ and $(m-1)T$, when calling *m* the number of matrices or nodes which will be crossed.

It is sufficient, for instance, to stop the marking process at $(m-1)T$, so as to avoid the marking of longer paths.

A display network operating as stated above is shown in FIGURE 5.

The duration T of the definite delay is slightly longer than the duration of the distributor cycle by the time corresponding to one or two complete pulses.

FIGURE 4 represents, in an actual network, two possible paths from E to S, one path crossing matrices $A_1$, $B_1$, $C_1$ and $D_1$, in the different stages A, B, C, D, whereas the other path crosses matrices $A_1$, $B_2$, $C_2$, $B_3$, $C_1$ and $D_1$. There is assumed that there was no available link between $C_2$ and $D_1$, whereas there were overflow possibilities between $C_2$ and $B_3$. In the display network of this network, because of the marking delay when crossing each "node," the output S receives the first marking pulse through the shortest path available. In this particular case, just the output of "node" $B_3$ of the second path has been marked then. In this instance of the structure of an overflow network, there is therefore a difference in marking time at least equal to two cycles of the distributor between the passage of the marking through a short path and through a longer path.

The operation of the display network of FIGURE 5 will now be described. A signal applied at time $t_0$ to AND gate 22 next to the marked input E, operates memory 23 in the first "node" 24. At time $t_0$, inlets 25 of AND gates 26 of "nodes" 27 receive a continuous signal, according to the availability condition *d* provided by a circuit 28 analogous to 9, FIGURE 2. The bistable device 29 is switched to the "on condition" at the instant when distributor 30 marks the inlet level of gate 26. This instant corresponds to instant $t_0+\epsilon$ with $\epsilon<T$. However, the marking of outlet multiple 31 will be delayed until $t_1$, which is the start of another cycle of distributor 30. This is due to the fact that flip-flop 29 is followed by a two-inlet AND gate 32, one inlet of which is connected to outlet 33 of distributor 30. Outlet 33 is energized only at the start of each cycle. The outlet of gate 32 is connected to the inlet of flip-flop 34 the outlet of which is connected to multiple 31. Thus, it will be seen that the call proceeds through the network until a pulse or a train of pulses reaches the outlet S at the instant $t_0+(m-2)T+\epsilon$ wherein $\epsilon$ represents the pulse position with respect to the start of the last considered cycle.

The process of identification and selection of the link immediately preceding the last lower marked point, i.e. in this case "node" 35, proceeds in the same way as in the embodiment of FIGURE 2, i.e. through identifier 36. On the other hand, the operation of distributor 30 must be stopped as soon as a pulse is received at S, i.e. at least at time $t_0+(m-1)T$. This is due to the fact that these pulses are only intended to enable the marking process to identify the last link and not to intervene in the selection process.

On the other hand, as seen in the preceding embodiment shown in FIGURE 2, the identification of the upper links was handled by retrograding the chain of "nodes." In the present case, it may be seen that matrix $C_1$ of FIGURE 4, corresponds, to the "node" 37 which therefore should have two gates 38 opening to links leading to $B_1$ and to $B_3$. Such a case may also be found in another stage of the network. In this case, the two inlets of the matrix may be marked at different cycles of distributor 30. In the general case, nothing causes the path of the mark reaching one of the inlets to be as short as that reaching the other inlet. The sole condition is that the path followed is shorter than the shortest path that will connect E to S. Now, during the selection process, nothing prevented the selection stopping on the gate corresponding to the longest path, and this is contrary to the object of the invention. Therefore, there is provided means to mark the preceding matrix, as soon as the identifier 36 has chosen the last link. However, instead of proceeding immediately to an identifiication of links, the memories of the display network are deleted and the marking from inlet E starts again. Then, everything takes place as if the shortest path between inlet E and the last lower marked "node" has to be found. The operation is repeated as often as necessary for identifying the whole path; the total marking and selecting time then becomes $$\left(\frac{m-1}{2}\right)T$$

if $m$ is the number of the crossed "nodes."

In FIGURE 5, it will be noticed that there a selector 39 and node selection gates 40, 41 and 42 which fulfil the same functions as the corresponding devices 14, 16 and 20 in FIGURE 2.

According to another embodiment of the invention, remarking at each selection can be avoided, by blocking, during a single marking operation, the "nodes" as soon as the memories or flip-flop of these "nodes" have been set "on," in order to avoid undesirable markings executed during subsequent cycles of distributor 30.

For this purpose, the structure of a node is modified according to FIGURE 6. For each analogous link for example, between nodes 24, 27 there is individually provided a delay device or flip-flop 43 and a gate 48. Means are also provided to prevent the synchronizing pulses $t_1$ from operating the delay device as soon as the memory or flip-flop 44 of the "node" is marked.

It will be noticed that this solution requires a greater number of devices than the preceding solution as some devices which were present only one in each "node," now are present one in each link. However, said solution has the advantage to require only a total marking and selecting time $2(m-1)T$.

The "node" of FIGURE 6 also comprises AND gates 45 and 46 respectively similar to gates 26 and 40 of "node" 27 of FIGURE 5. Flip-flop 44 has two outlets, one of which is applied to the inlet of an inhibiting gate 47 to prevent the marking of a new flip-flop 43 through AND gate 48. As stated above, this permits to block the "nodes" as soon as they are operated.

By examining the constitution of the "nodes" in the display network, there is ascertained that nothing is specific to one "node" and that all the "nodes" have evident analogies. The control and the connections towards the logical circuits are strictly similar. Thus, the network combined paths or itineraries of all lengths. If all the combined paths of length $m$ are busy, a combined path of length $p$ superior to $m$, or, in default, an itinerary $q$ still longer, will be chosen.

FIGURE 7 represents an embodiment of switching network in which inlet E has to be connected to an outlet which is not entirely determined, i.e., which can be chosen amongst a determined group S of outlets. Those skilled in the art call this problem that of the free search.

It would suffice to establish connections between E and any one of the outlets $S_1$, $S_2$, $S_3$ or $S_4$ of group S. In fact, the selection of the outlet should be subordinated to the length of the path linking it to the inlet, and to give the preference to the outlet accessible through the shortest path. In FIGURE 7, behind the outlet group S, a matrix 49 having a single outlet S′ is represented. This matrix is but a virtual one in the actual network, but it is materialised in the display network. The matrix enables a selection between the different outlets $S_1$, $S_2$, $S_3$ and $S_4$ that takes into account the length of the path. In the display network, the link between the inlet E and the single outlet S′ is considered. Therefore, according to the invention, the display analogous network of a network wherein free searches are possible comprises, in addition to the display "nodes" which represent the matrices of the network, "nodes" whose inlets correspond to a determined group of outlets. These "nodes" constitute the lower point of the network when one of the outlets, to be determined in the group, has to be linked to a determined inlet.

FIGURE 8 represents the part of a display network according to the invention, corresponding to the part of the actual network in FIGURE 7. Namely, "nodes" 50, 51 and 52 respectively correspond to matrices 53, 54 and 55. "Node" 56 corresponds to the virtual matrix 49. "Node" 56 is similar to "node" 35 of the network of FIGURE 5 with the exception that the virtual outlet S′ is not represented. Gate 57, similar to gate 58, is connected to one of the outlets of the group. Gate 59, similar to gate 42, has its outlet connected to the identifier of the network, and one of its inlets connected to the selector. On the other hand, the multiple 60 which has four inlets corresponding to $S_1$, $S_2$, $S_3$ and $S_4$, has been represented. It will be understood that each branch of multiple 60 comprises in series an AND gate similar to 57.

The operation of the network of FIGURE 8 is as follows: input E and gate 59 being marked by the selector, as soon as a pulse reaches the identifier through gate 59, its time position is recorded, and the network is blocked. An outlet of the group then is chosen. The case is then reduced to the preceding case of the network of FIGURE 5 or 6, and the path is completed in the same way. It will be noted that "nodes" 51 and 52 may comprise no flip-flop involving a delay when the other outlets of 51 and 52 are outlets of the network. On the other hand, if the outlets of a group would be very numerous, a plurality of virtual matrices such as 49 would be needed in order to concentrate them in one sole outlet. In that case, the number of "nodes" necessary for representing these matrices would be provided. Besides, it will be obvious that the number of inlets of a "node," i.e., the number of outlet positions of the distributor, would be determinative and not the number of inlets of a virtual matrix. The outlet capacity of the distributor is, as previously mentioned, limited to a minimum equal to the least by the greatest number of inlets of an actual matrix and, to the most, a maximum determined by the object of the invention.

Then, it is obvious that if the order of scanning the "node" inlets by means of the distributor would be fixed, certain inlets and hence certain paths would be seized more often than the others, this causing a non-homogeneous wear of the equipments in the actual network and increased risks of faults. Therefore, according to a feature of the invention, a rotation of the inlets priority is obtained by modifying at each cycle the order of advancing the distributor, for instance by modifying the starting of the time basis which pilots it. A rotation of the priority may also be obtained by introducing, before identification, a delay varying at random, equal or less than the duration of a scanning cycle.

While the principles of the present invention have been described in connection with specific embodiments, it is to be clearly understood that this description is made only by way of example and not as a limitation on the scope of the invention.

We claim:

1. A telephone switching network comprising a plurality of groups of crosspoint matrices, said groups being cascaded to extend from input terminals on an input side to output terminals on an output side of said network, path selecting means operated responsive to marking signals applied to selected ones of said input and output terminals to select an available path through said network, said path selecting means comprising an analogous display network having nodes representing each of said matrices with upper nodes representing matrices connected to input terminals and lower nodes representing matrices not connected to input terminals, availability means common to all of said lower nodes in said path selecting means for marking all available ones of the nodes in the paths between said marked input and all available output terminals, pulse distributor means for periodically individually marking said nodes, means in said lower nodes operated responsive to the junction of said availability marking and signal or preceeding node marking for marking said succeeding one of said nodes and control means for sequentially selecting and identifying particular ones of said nodes commencing with the selected lower node connected to said marked output terminal and terminating with the upper node connected to said marked input terminal to select an analogous path through said crosspoint matrices.

2. In the path selecting means of claim 1, including means for connecting said pulse distributor means connected to the input of said lower nodes for providing enabling pulses at allotted time slots in a pulse distribution cycle, and means for identifying said marked lower nodes by the time slot tapped from each of said lower nodes.

3. In the path selector means of claim 2, wherein means are provided for removing said marking from said nodes responsive to the identification of said nodes.

4. In the path selector means of claim 3, wherein each node comprises bistable memory means for transmitting a continuous marking signal responsive to the receipt of a pulse at the input of said memory means, means for transmitting said continuous marking signal to all nodes accessed to said pulsed node.

5. In the path selector means of claim 1, wherein each of said nodes comprises time delay means for delaying the propagation of said marking a fixed period of time at each node, and means for identifying analogous matrices responsive to the time delay of the marking signal received at said selected lower node.

6. In the path selector means of claim 4, overflow means in said switching matrices and in said path selecting means, said nodes comprising time delay means for imparting a definite delay to said marking signal passing through each of said nodes in said path from said upper node to said selected lower node and means for determining the length of said path responsive to the overall delay of said marking at said selected lower node.

7. In the path selector means of claim 6, wherein said total delay time of said path is equal to the time distribution cycle.

8. In the path selector means of claim 7, wherein means are provided for halting said cyclic enabling of said node inlets after said first cycle, and means for taping said marking signals from said selected lower nodes.

9. In the path selector means of claim 7 and means for locking said nodes responsive to said marking conciding with said time distribution cycle.

References Cited by the Examiner

UNITED STATES PATENTS

| | | | |
|---|---|---|---|
| 2,987,579 | 6/1961 | Dunlap | 179—18.7 |
| 3,051,793 | 8/1962 | Hiller et al. | 179—18.7 |
| 3,148,247 | 9/1964 | Voegtlen | 179—18.7 |
| 3,214,521 | 10/1965 | Petry | 179—18.7 |

KATHLEEN H. CLAFFY, *Primary Examiner.*

L. A. WRIGHT, *Assistant Examiner.*